upon or form a part of a suitable support 52 which may be curved so that a portion of a side wall of a tire may be brought into position over the upper surface of the electrode. The electrode 51 is preferably thin, and may be mounted on a suitable plunger 53 which may be raised and lowered, and may be pressed down toward the electrode 50. The plunger may carry a block of wood 58 or other insulating material between it and the electrode. As the electrodes are in parallel planes, and as the inner and outer surfaces of the tire are neither flat nor parallel, there are provided a pair of pads 54 and 55 for application to opposite sides of the tire wall. Each of these pads has a flexible casing so that it is deformable, and is filled with a material having substantially the same dielectric constant as the tire. It may be made up of small pieces of vulcanized rubber, or fine particles obtained from the previous cutting away of a tire in preparing the same for the insertion of the uncured rubber. It may also be plastic or other finely divided material. Dry sand has been found to be quite satisfactory as a filling material. As the casings of the two pads 54 and 55 are flexible and substantially non-stretchable, the plunger 53 in being forced downwardly toward the lower electrode will put the filling material under pressure, and will distort the casings of the filler pads so as to apply equal pressure over considerable portions of the area of the inner and outer surfaces of the wall.

The temperature at the area where the vulcanizing is to be effected may be noted or recorded by a thermometer 59, thermo-couple, or other suitable instrument. This may, if desired, have its inner end secured to the lower wall of the casing.

Here, as with the previous forms, the two electrodes are connected to the opposite terminals of the high frequency oscillator. By the term "connected" I include direct connection as well as indirect connection, as through a ground. For instance, the electrode 51 may be directly connected to the oscillator, and the electrode 50 and the other terminal of the oscillator grounded.

It will be noted that in each of the forms illustrated the electrodes present flat parallel surfaces, and filling material is employed between the two electrodes and the opposite sides of the portion of the tire to be repaired.

In the uncured rubber applied in making the repair there may be incorporated threads or cords as reinforcement, and in accordance with the usual practice in tire repair, and a patch or layer of the uncured rubber may be applied along the inner surface of the tire wall over an area somewhat larger than the portion filling the hole in said wall.

In a test of the type of apparatus shown in Fig. 6, highly satisfactory results were obtained by using approximately 500 watts at 4 to 5 megacycles for four minutes to bring the section of about six square inches up to vulcanizing temperature, and then 100 watts at 1 to 2 megacycles for ten minutes, for holding the temperature during the vulcanizing period.

The electrodes shown in Fig. 6 need not be in parallel flat planes, but may be in parallel arcuate planes. In that case the inner pad may be omitted if the curvature of the inner electrode approximates the normal curvature of the surface of the tire walls. It need not exactly conform to said curvature, as the tire wall may be somewhat flattened or curved to a somewhat greater extent by the pressure applied by the outer electrode. As the tire is supported primarily by the lower electrode in the construction shown in this figure, and as it is desirable that the supporting electrode be in a substantially horizontal plane, it will ordinarily be necessary to provide a pad between the inner electrode and the inner surface of the tire, and to make the support for the inner electrode curved as shown in the drawing, so that any desired part of the tire may be brought into position between the electrodes.

Having thus described my invention, what I claim as new and desire to secure by Letters Patent is:

1. The process of repairing a tire by vulcanizing uncured rubber thereto at the area requiring repair, which includes supporting said tire area between spaced flat electrodes presenting parallel surfaces of greater area than the area of the portion of the tire to be repaired, spacing said tire area from said electrodes by solid material which is in subdivided flowable form and which has substantially the same dielectric properties as the tire, subjecting said tire area to pressure, and producing between said electrodes a high frequency eelctrostatic field of sufficient heating effect to vulcanize said uncured rubber.

2. An apparatus for vulcanizing uncured rubber applied to an area of the tire in which the repair is to be effected, said apparatus including a pair of spaced electrodes presenting substantially parallel faces of greater area than the area of the portion of the tire to be repaired, filling material disposed on opposite sides of the area to be vulcanized and between said electrode faces, said material having substantially the same dielectric properties as the tire, means for subjecting said tire and filling material to pressure, and means connected to said electrodes for producing therebetween a high frequency electrostatic heating field.

3. An apparatus for vulcanizing uncured rubber applied to an area of the tire in which the repair is to be effected, said apparatus including a pair of spaced electrodes presenting substantially parallel faces of greater area than the area of the portion of the tire to be repaired, filling material disposed on opposite sides of the area to be vulcanized and between said electrode faces, said material having substantially the same dielectric properties as the tire, means for effecting relative movement of said electrodes toward each other to compress said filling material against said tire, and means connected to said electrodes for producing therebetween a high frequency electrostatic heating field.

EINO E. LAKSO.

REFERENCES CITED

The following references are of record in the file of this patent:

UNITED STATES PATENTS

| Number | Name | Date |
| --- | --- | --- |
| 1,162,397 | Price | Nov. 30, 1915 |
| 2,280,771 | Dufour et al. | Apr. 28, 1942 |
| 1,427,109 | Kasson | Aug. 29, 1922 |
| 1,467,761 | Jones, Jr. | Sept. 11, 1923 |
| 1,925,993 | Cassley et al. | Sept. 5, 1933 |
| 1,983,705 | Pilblad et al. | Dec. 11, 1934 |
| 2,032,222 | Norris | Feb. 25, 1936 |
| 2,327,781 | Glynn | Aug. 24, 1943 |
| 2,340,692 | Ridd | Feb. 1, 1944 |
| 2,347,952 | James | May 2, 1944 |
| 2,341,617 | Hull | Feb. 15, 1944 |

May 27, 1947.  C. W. VOGT ET AL  2,421,098
REPAIR OF TIRES
Filed Dec. 16, 1943  2 Sheets-Sheet 1
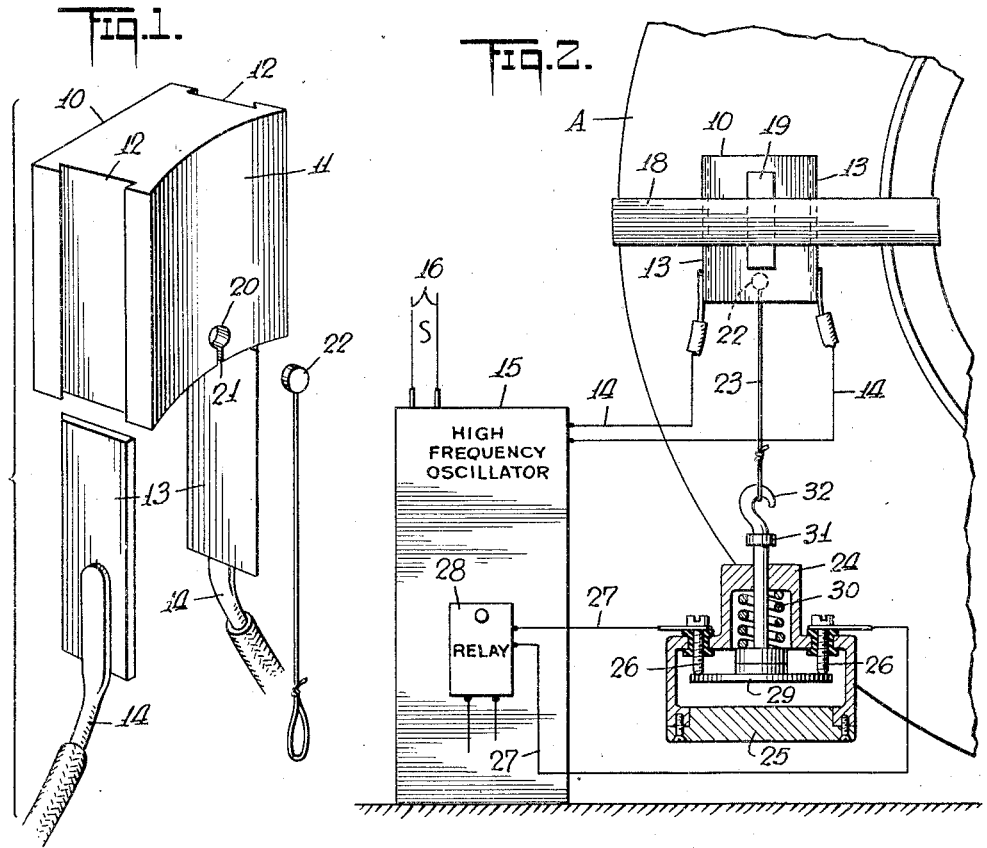
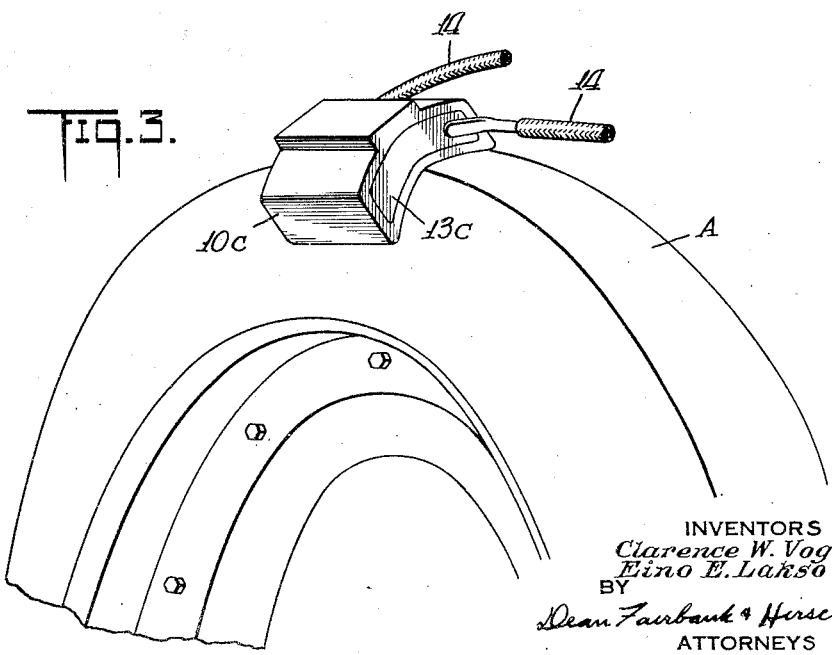
INVENTORS
Clarence W. Vogt
Eino E. Lakso
BY
Dean Fairbank & Hersch
ATTORNEYS May 27, 1947.　　　C. W. VOGT ET AL　　　2,421,098
REPAIR OF TIRES
Filed Dec. 16, 1943　　　2 Sheets-Sheet 2
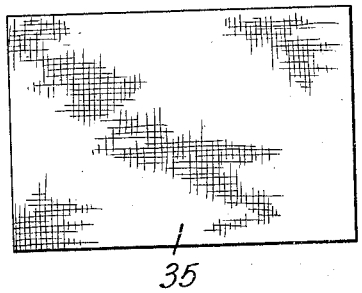
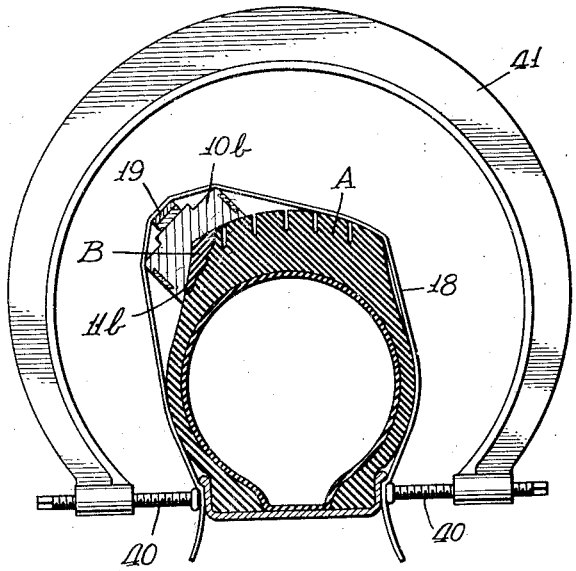
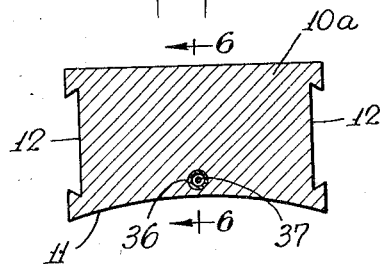
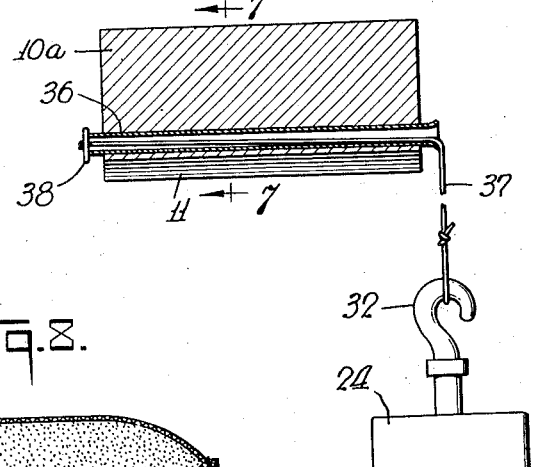
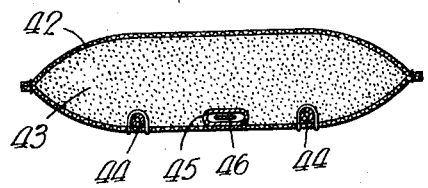
INVENTORS
Clarence W. Vogt
Eino E. Lakso
BY
Dean Fairbank & Hirsch
ATTORNEYS Patented May 27, 1947

2,421,098

UNITED STATES PATENT OFFICE 2,421,098

REPAIR OF TIRES

Clarence W. Vogt, Norwalk, Conn., and Eino E. Lakso, Fitchburg, Mass.; said Lakso assignor to said Vogt Application December 16, 1943, Serial No. 514,452

21 Claims. (Cl. 18—18)

This invention relates to the repairing of tires by the vulcanization of patching material at cuts or weakened places in the outer casing or shoe. The main object of the invention is to facilitate the repair of tires while inflated and on the rim, and in many cases, while still on the wheel. A further object is to provide simple, readily transportable heating apparatus which may be carried readily from place to place on a vehicle and which does not require the use of a steam boiler or other source of steam.

A further object is to provide an improved heating means which may be readily applied to heat and vulcanize the uncured rubber or composition used in making a repair of a tire.

A further object is to provide a heating means which may be readily applied to a tire either on or off the vehicle and in which the heating effect is produced by a high frequency electrostatic field between spaced parallel electrodes disposed outside of the tire.

A further object is to provide a heating device which will conform substantially to the contour of the tire and which may be positioned on or closely adjacent to the outer surface of the tire wall and with the electrodes spaced apart to a greater distance than the width of the area to be repaired, so that the uncured rubber applied in making the repair will be in the field between said electrodes.

A further object is to provide an improved means for detachably holding the heating means in place and under the desired pressure, on an inflated tire on a rim, which latter may be on a vehicle wheel.

A further object is to provide a simple and effective means for terminating the heating action when the desired temperature has been reached in the vulcanizing area.

As an important feature of the invention, there is provided a pair of parallel electrodes which may be applied to the tire at opposite sides of the area to be repaired and effect the vulcanization by the use of a high frequency electrostatic field developed between said electrodes when connected to a suitable source of high frequency current.

As an important feature of the invention, the heating is effected by the corona effect between the electrodes, and whereby the field is very substantially deeper than the dimensions of the electrodes.

As a further feature, the electrodes are mounted on a block which holds them in predetermined spaced positions and which block may act to apply the desired pressure on the rubber to be vulcanized.

As a further feature, there is employed a nonmetallic member between the electrode for holding a circuit breaker in closed position, and which, when heated to a predetermined temperature, will give way and cause the circuit between the electrodes to be broken.

In the accompanying drawings, Fig. 1 is a perspective view of a portion of one form of apparatus which may be employed, the parts being shown separated from each other.

Fig. 2 is a side elevation of a portion of a tire with the apparatus applied and with the circuit breaker shown in section.

Fig. 3 is a perspective view showing a modified form of a part of the apparatus.

Fig. 4 shows a sheet which may be used between the tire and the electrode carrying block.

Fig. 5 is a section through a tire and a further modified form.

Fig. 6 is a section through an electrode carrying block having a different form of automatic control element, said section being taken on the line 6—6 of Fig. 7.

Fig. 7 is a section on the line 7—7 of Fig. 6, and

Fig. 8 is a section through a further form of electrode carrying member.

In the construction shown in Figs. 1 and 2, the member employed to support the electrodes, and which is applied to the tire, is illustrated as a block 10 of a suitable dielectric. It is preferably of wood and may be formed as a single piece or made up of laminated plies. Instead of using wood, it may be of a molded plastic or a cast composition. If of a porous nature, such as wood or cast plaster of Paris, it may be impregnated or coated with a suitable material which will either completely fill the pores or seal them so that there can be no absorption of moisture from the atmosphere. This is desirable, because if there be any variation from time to time in the moisture content of the electrode supporting body, the dielectric properties of the body will vary and the heating effect of a given field for a given time will not be constant.

One surface of the block has a contour substantially the same as that of the portion of the tire to which the block is to be applied. As illustrated, the face 11 is slightly concave so that it may substantially fit the side wall of a tire casing or the tread of the tire if the latter be relatively smooth, or made substantially smooth by the application of patch material on the tire, and, if necessary, non-vulcanizable groove filling material in the patch.

In practice, a series of these blocks may be employed differing from each other primarily in the contour of the surface 11 so as to fit tires of different sizes for different portions of the tire. The block size may vary, but it should be of such size that the surface 11 exceeds in length and width, the area to which the patch has been applied on the tire.

The block carries, or is adapted to carry, a pair of spaced parallel electrodes. Where a plurality of the blocks are provided, it is preferable that the electrodes be permanently attached to the source of high frequency current and may be readily detachable from the block so that they may be attached to a block selected in accordance with the size of the tire and the contour of the area to be repaired.

As illustrated, the block 10 has a pair of grooves 12 in opposite surfaces, and these have their opposite sides undercut so that a pair of electrodes 13 may be slipped endwise into the grooves and fit friction-tight therein. The electrodes are of a length exceeding the length of the area to be vulcanized and are preferably in the form of flat metal strips. These may have permanently welded, or otherwise secured thereto, conductors 14 for connection to a source of high frequency current such as a unit 15. This may be a standard unit receiving alternating current through lead lines 16 and acting to impart to the current delivered through the conductors 14 of very high frequency suitable for creating an electrostatic heating field between the two electrodes 13.

The tire A may have the cut or damaged portion treated in the usual manner common in the art. A portion of the rubber of the tire in the vicinity of the cut or damaged spot is cut away to provide a relatively smooth surface, and the cut away portion replaced by the vulcanizable patch material. This may be unvulcanized rubber or rubber composition pressed into place to make what is commonly referred to as a spot patch. By the term "rubber" as used in this case, we include both natural and synthetic rubber, as well as other compositions which may be applied in a soft moldable condition and cured to a tough elastic state by the action of heat.

When this preparatory work has been completed in a manner commonly done in the art, the block 10 is clamped to the tire with the surface 11 covering the patch, and the block is pressed tightly against the patch area so as to apply the desired pressure against the uncured rubber to be vulcanized. One method which may be employed for holding the block in place and to apply the desired pressure is to secure it by a tight strap 18 and to then drive one or more wedges 19 between the outer surface of the block and the strap so as to render the strap taut and to apply pressure to the patch. The tire may be partly deflated before the block is secured in place and may then be fully inflated to insure the pressing of the tire wall against and into conformity wtih the block surface. Other means for effecting the attachment of the block to the tire will be referred to hereinafter.

With the block tightly clamped in place and with the electrodes upon the exterior of the tire and upon opposite sides of the material to be vulcanized, the circuit is closed and a high frequency electrostatic field is developed between the electrodes. The field is not limited to the space directly between the electrodes, but there is a substantial corona effect so that although the rubber to be vulcanized may not be directly in between the two electrodes, it is still in the field, and by reason of the action of the field, the uncured rubber is heated very quickly to the vulcanizing temperature, while being held under pressure.

The surface 11 of the block should be such that it will not adhere to the rubber of the patch being vulcanized. For instance, it may be dusted or coated with powder soapstone or other such composition. In order that the operator may be able to ascertain whether the heating field has been substantially uniform over the area of the patch being vulcanized, an indicator may be used. For instance, there may be provided sheets of material which will change color or slightly char when heated to the temperature desired for vulcanization. A suitable material is one commonly known as Holland cloth with a coating of varnish. The operator may be provided with a series of such sheets 35 cut as indicated in Fig. 4, and of an area preferably slightly larger than the surface 11 of the block. The sheet may be applied over the patch before clamping the block in place, and when the block is removed, the operator can tell from the extent and uniformity of the discoloration of the sheet, whether the heating has been that required for proper vulcanization.

As a further feature of the invention, means are provided for automatically breaking the circuit when the temperature in the field, and particularly at the place to be vulcanized, reaches a predetermined point.

To effect this automatic control, the block 10 may carry or confine a material which is under mechanical stress and which will give way when the desired temperature is reached. As one embodiment of this feature of the present invention, the block 10 may be provided with a small chamber 20, preferably opening into the surface 11 adjacent to one end of the latter and provided with a narrow passage or throat 21 leading to the end of the block. A pellet 22 is provided of such size that it may slip into the chamber 20 and of such a composition that it will melt, fuse, or soften at the temperature to which it is desired to heat the patch rubber. Various different materials may be employed which will have the desired melting, fusing, or softening temperature, and the composition of the pellet may be varied or blended of different ingredients so that its melting or softening point will be within comparatively close limits and properly related to the vulcanization temperature of the patch rubber. Merely as an example, the pellet may be formed of phenol formaldehyde crystals molded together and which will have a melting point of 270 to 300° F.

The pellet 22 has molded therein or secured thereto one end of a flexible cord 23, of dielectric material, the other end of which is secured to a circuit breaker 24 with the cord under tension. The circuit breaker is preferably of such a type that when it is held suspended by the cord, the circuit will be closed, but as soon as the cord gives way, the circuit will be automatically opened.

As illustrated in Fig. 2, the circuit breaker includes a comparatively heavy casing 25 with contacts 26 connected by wires 27 to a relay 28. Within the casing 25 is a switch 29 which can be held in engagement with the contacts 26 and against the action of a coil spring 30 encircling a plunger member 31. This plunger member 31 may have a hook 32 which may detachably engage the cord 23 so that when the circuit breaker is suspended from the cord, the weight of the casing will be such as to compress the spring and hold the circuit closed. When the cord 23 gives way, the spring will automatically open the circuit and the casing may drop to the ground. When the relay circuit is thus broken, the current to the electrodes 13 will likewise be broken and the production of heat in the field will be stopped.

A supply of the pellets with the attached cords will be provided, and if desirable, the pellets may be of different melting points so that the operator may select one in accordance with the temperature which is to be developed in the area being vulcanized, and in accordance with the vulcanization characteristics of the rubber composition used in making the repair. The cords 23 may be of any desired length, but the length is sufficient so that the circuit breaker may be suspended and the circuit held closed by the weight of the circuit breaker itself.

The circuit breaker may serve as the main control of the current for the heating field, as the electrode carrying block may be applied and the entire apparatus set up ready for vulcanizing, and when the operator is ready, he merely lifts the circuit breaker and hangs it from the end of the cord 23.

Obviously, various other forms of circuit breakers may be employer, and the weight of the circuit breaker need not be utilized for effecting the breaking of the circuit. The form illustrated is simple, convenient and substantially fool-proof, and may be readily attached by an operator making a repair to a tire while on the road, and without removing the tire from the wheel and without deflating the tire.

Various other means may be employed for automatically controlling the circuit and breaking it when the desired temperature is reached. In Figs. 6 and 7 there is shown an alternative form in which the block 10a is provided with a hole extending lengthwise therethrough and parallel to the surface 11. This hole, if desired, may be lined with a tube 36 of non-metallic material and which will not fuse or become affected by the vulcanization temperature employed. A strand or thread 37 may be extended through this tube, fastened at one end to a transverse rod or stop 38 and provided with a loop at the other end for receiving the hook 32 of the circuit breaker. The material forming the strand may be of a composition which will have sufficient tensile strength to sustain the weight of the circuit breaker at temperatures below that required for proper vulcanization, but with a low tensile strength at higher temperatures. Thus, when the temperature in the field has reached the point where the rubber is properly vulcanized, the strand will break and the circuit will open. The composition and the diameter of the strand may be selected to give the desired strength at low temperatures and the breaking under a predetermined load when the temperature at which vulcanization is completed is reached.

A simpler form is one in which a narrow ribbon of dielectric frangible material is clamped over the patch by the block 10 and the end serves to support or release the circuit breaker or the switch thereof. This ribbon may be of a material of low tensile strength when heated to a predetermined temperature. Thus, the ribbon will break at the outer edge of the block when the vulcanizing temperature is reached at the patch.

Such a ribbon may be of various different compositions, such for instance as a suitable vinylidine chloride polymer sold under the trade name "Saran." Such ribbons may be furnished in coils or on spools and the operator may cut off a section of the proper length for each repair job, and tie the ribbon to the switch breaker when he is ready to turn on the heat for vulcanizing. This material in ribbon form is very strong at ordinary temperatures and may be of a cross-section and variety which has a softening and great reduction in tensile strength at the temperature desired for vulcanizing.

Other control means may be used such as a nonmetallic tube containing a volatile liquid developing a sufficient pressure to operate a diaphragm or straighten a Bourdon tube and break the circuit when the vulcanizing temperature is reached. In some cases, a thermo-couple may be used and properly insulated or connected to prevent the heating current from affecting the temperature indicating instrument.

In Fig. 2, the block is shown as applied to the side of the tire and the band 18 extends around the tire and rim. Where a disc wheel is used, it may not be practical to secure the band in that way. In Fig. 5, the band 18 is shown as having its ends clamped against the opposite sides of the rim by screwbelts 40 on a yoke 41. In this figure the block 10b is shown as having its surface 11b substantially V-shaped, so as to fit the angle where the side wall joins the outer surface of the tread and where the patch material B is built up to restore the tire to the desired form.

In the constructions above referred to, the electrodes extend substantially parallel to the tread of the tire. This is not essential as the electrodes may extend transversely of the tread. In Fig. 3 there is shown a block 10c which has electrodes 13c set into depressions or chambers in opposite ends of the block and permanently held in place. These are curved, rather than straight, so that they will be not only parallel to each other but substantially follow the contour of the tire surface. The block is shown with an outer substantially flat face for engagement of a clamp, wedges, or other means for applying the block tire and holding it in position with the desired pressure.

In the constructions above referred to, the electrode carrying body is a solid and rigid block. This is not always essential as the electrode carrying body may be of non-rigid form, so as to better adapt a single unit to various different shapes and contours of tire areas. The electrodes may also be flexible. In Fig. 8, there is shown a canvas bag 42 filled with sand or other readily deformable material 43 and having parallel electrodes 44 within the bag and stitched or otherwise secured to one wall so as to hold the electrodes in parallel positions, but permit electrodes and the wall of the bag between the electrodes to be bent to conform to the surface of the tire. The electrodes are preferably encased in insulating material and may be spaced at any desired distance inwardly from the wall of the bag to prevent liability of overheating directly below the electrodes. They are so connected to the bag wall or by other means as to hold them at all times parallel. In Fig. 8, there is also shown a nonmetallic tube 45 extending through the bag between the electrodes and through which a tape 46 may be threaded; the tape being of a character which may be held under tension during the heating, and give way when the desired tempera-